May 18, 1937. R. S. BEGG ET AL 2,080,395
BRAKE DRUM AND BACKING PLATE COMBINATION
Filed March 2, 1931 3 Sheets-Sheet 3

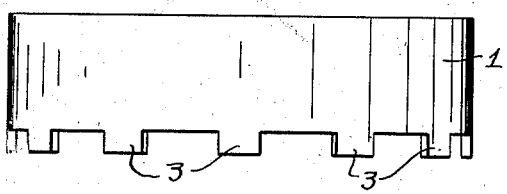
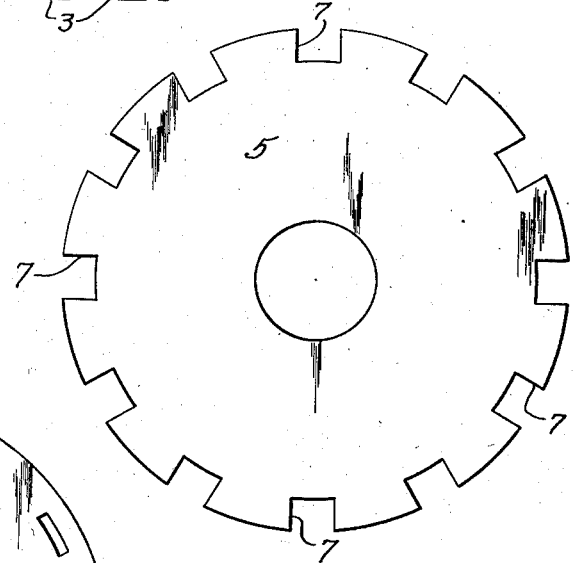
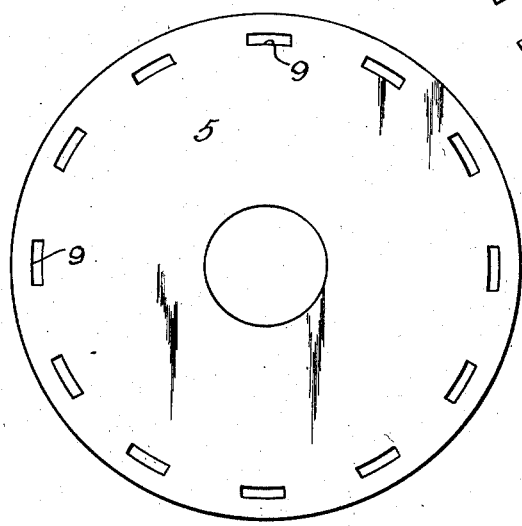
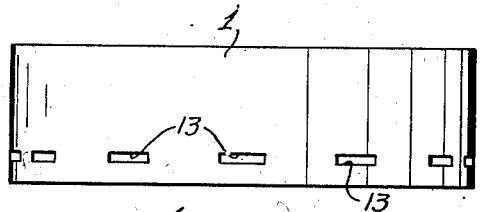
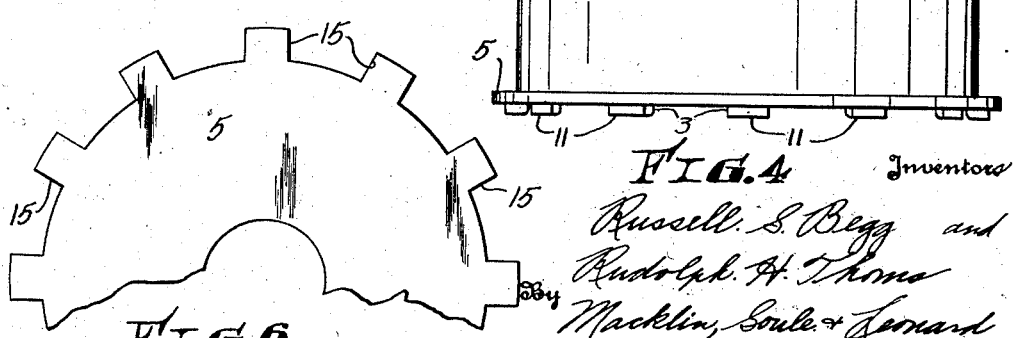

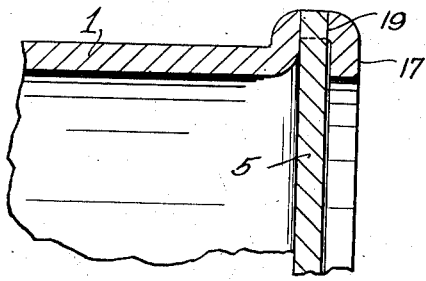
FIG.7
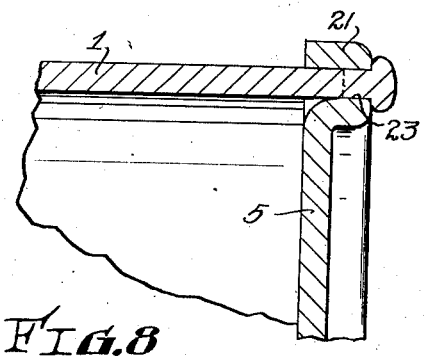
FIG.8
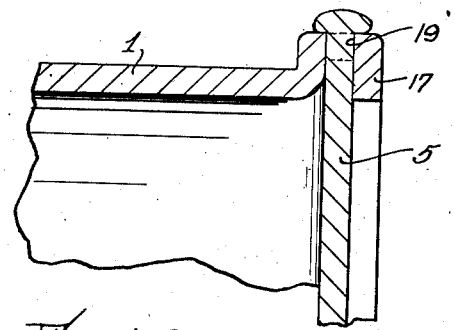
FIG.9
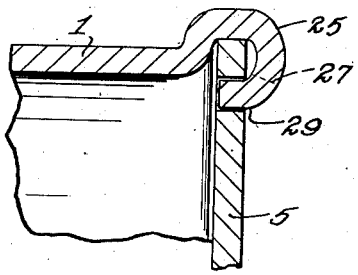
FIG.10
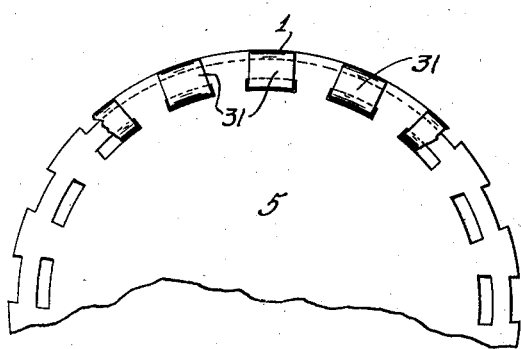
FIG.11
FIG.12

Inventors
Russell S. Begg and
Rudolph H. Thoms
By Macklin, Soule & Leonard
Attorneys Patented May 18, 1937

2,080,395

UNITED STATES PATENT OFFICE 2,080,395

BRAKE DRUM AND BACKING PLATE COMBINATION

Russell S. Begg, Shaker Heights, and Rudolph H. Thoms, Cleveland, Ohio, assignors to The Midland Steel Products Company, Cleveland, Ohio, a corporation of Ohio Application March 2, 1931, Serial No. 519,352

5 Claims. (Cl. 188—218)

This invention relates to brake drums and particularly to a brake drum and backing plate combination wherein the drum and plate are separately formed members.

The important features of our invention include the manner in which the drum and plate are secured together.

In many instances it is desirable to form the drum and plate of different materials or different grades of steel, the drum often being of the more expensive metal and in such cases economies in material cost can be effected by the practice of our invention.

The manner herein described is also useful in connection with the copending application of Russell S. Begg and James H. Crowe, Serial No. 509,172, filed January 16, 1931, which is now United States Patent No. 1,900,804, issued March 7, 1933.

Other advantages and important features of our invention will become apparent from the following specification and drawings wherein:

Fig. 1 is a plan of one form of the drum.

Fig. 2 is a plan of one form of backing plate used in conjunction with the drum shown in Fig. 1, Fig. 3 is a plan of another form of backing plate which may be used with the drum of Fig. 1, Fig. 4 is an assembled view of the drum and backing plate shown in Figs. 1 and 3.

Figs. 5 and 6 illustrate another drum and backing plate similar to that illustrated in Figs. 1 to 4.

Figure 13:
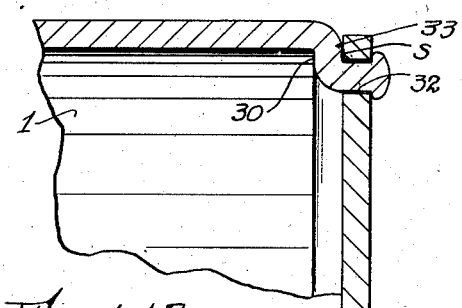

Figs. 7 and 8 respectively illustrate a drum and backing plate secured together in a manner described in Figs. 1 to 6 inclusive and in addition secured by the flange on one of the members.

Fig. 9 is an enlarged view of a drum and apron secured together illustrating one method in which the lugs may be fastened in place.

Figs. 10 to 19 inclusive illustrate other means of fastening the drum and apron together.

Referring to Figs. 1 to 4, the drum may comprise a cylindrical metal band 1, around one end of which are provided a plurality of lugs 3 extending parallel to the axis of the drum. A backing plate 5, adapted to be positioned coaxial with the drum secured to the drum 1, is notched or recessed about its periphery, as indicated at 7, to receive the lugs 3 snugly therein. The interlocking shoulders formed by the lugs and notches lock the drum and plate against relative rotation.

If desired, however, the recesses in the plate may be spaced inwardly from the outer edge of the plate, as indicated at 9 in Fig. 3.

When the plate and drum have been positioned with the lugs and notches interlocking, as described, the outer ends of the lugs may be bent over or upset to form a head 11, to prevent relative separation of the lugs and recesses.

In cases where the flange is used or the plate is otherwise retained, as herein described, the upsetting or bending operation is not absolutely necessary, however, and may be dispensed with. When unsecured, the drum or plate each may expand individually without affecting the other.

A similar manner of securing the drum and plate together is shown in Figs. 5 and 6. As there illustrated, the recesses 13 are provided on the drum, either as notches or radial passages inset from the end, the lugs or projections 15 being on the plate and extending radially therefrom. The projections 15 are preferably of constant width where engageable with the recesses of the drum. In this form the band may be laid around the plate with its recesses registering with and receiving the lugs of the plate and the free ends of the drum welded together when drawn to position. On the other hand, the drum may be welded first and the plate sprung into engagement.

In Figs. 7 and 8 respectively are illustrated modifications of the application of these methods in conjunction with an annular inwardly facing channel. Referring to Fig. 7, the drum is provided at one end with an annular inwardly facing channel 17 in the base of which are openings to receive radially disposed lugs 19 on the plate 5. The channel 17 may be left partially open to more easily receive the plate or the plate may be sprung thereinto. In Fig. 8, the circumferential margin of the plate 5 is turned to form an annular channel 21, coaxial with the drum 1 and of the same diameter so that the drum may easily be fit into engagement therewith. Recesses are formed in the base of the channel 21 to receive projections or lugs 23 of the drum for locking the drum and plate against relative rotation about the common axis. In all such cases, we find it economical to secure the lugs in the recesses by upsetting the end of the lug, as shown in Fig. 9. When one of the members is provided with an inwardly facing channel a modified form of lug and recess may be used effectively.

Referring to Figs. 10 and 11, we have shown a drum 1 having an annular channel 25, the peripheral margin of which is slit radially at separated points, as at 27, and the recesses in plate 5 placed in register with the free edge portions 29 thus formed. The portions of the channel are then bent into the recesses of the plate 5.

In all cases it is not necessary to form the channel entirely around the drum or plate but only at spaced portions indicated at 31 in Fig. 12. The plate 5 may engage these separated channels and, intermediate the points of engagement, extend outwardly to engage the ends thereof so as to interlock the plate and drum.

In the last two cases illustrated, it should be noted that economy of assemblage and manufacture in some instances make it more effective to form the channels on the plate and change the other engaging elements correspondingly.

In Fig. 13, one end of the drum is radially inset slightly to form a flange 30 coaxial with the drum. The inner edge of the flange is formed into lugs 32 and turned normal to the flange, leaving an annular shoulder 33. The peripheral margin of the plate 5 is provided with openings engageable with the lugs 32. The outer portion of the peripheral margin of the plate is spot welded to the annular shoulder 33 as indicated at S.

Figure 14:
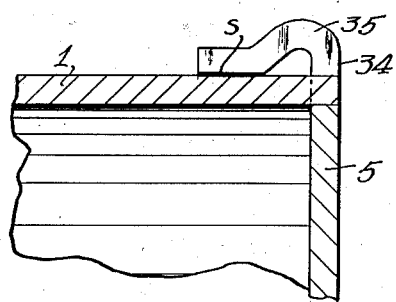
Figure 15:
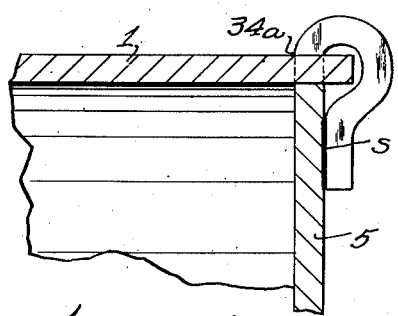

In Fig. 14 the lug 34 of the plate or drum, as the case may be, extends entirely through the other member and the end is bent over as indicated at 35, and spot welded to the other member, as indicated at S. In Fig. 15, the ends of the lugs 34a of the one member are shown as passing through recesses in the other member and then bent back and welded to the first member.

Figure 16:
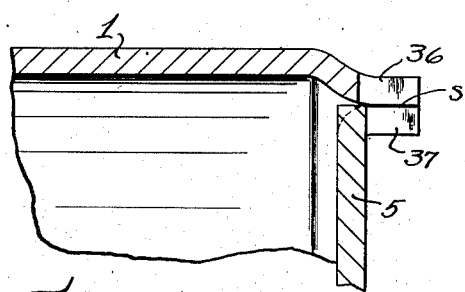
Figure 17:
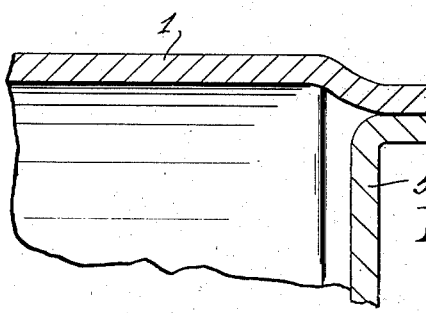
Figure 18:
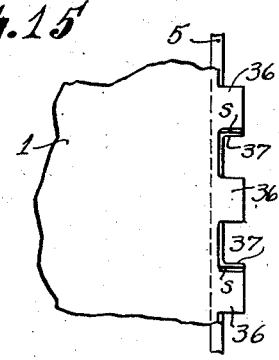

In Figs. 16 to 18 the drum is provided with the projections or lugs 36 and an annular serrated flange 37 is provided on the plate 5 and is adapted to engage the lug 36, face to face, the two being spot welded together as indicated at S. In Fig. 17, instead of lugs, flanges extending entirely around the circumference of each member are provided and placed face to face and spot welded at separated points.

Figure 19:
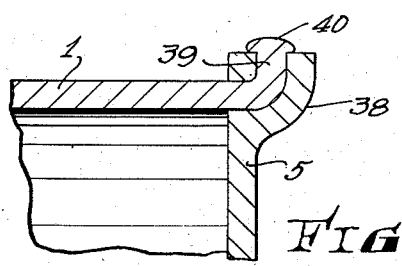

In Fig. 19 one of the members, for instance, plate 5, is provided with an annular channel 38 which receives the drum 1. The outer or circumferential wall of the channel is recessed with radially extending passages so that the lug 39 may be passed therethrough and be upset at the end as indicated at 40.

In the various forms shown the lugs or projections may be either on the plate or drum and the corresponding recesses may be on the other member of the two.

In the manner illustrated numerous effective ways of securing the drum and plate against relative rotation are provided, the particular form used depending somewhat on the value of materials used, ease of assemblage and the class of drum desired.

In some cases it is not necessary to upset the end of the lugs, to form a rivet head so as to secure them in place. In many of the forms illustrated, the drum may expand radially independently of the plate. In the form illustrated in Fig. 14, expansion of the drum relative to the plate will merely cause a slight bending or movement of the projections or tongue 34. Such expansion may also be permitted in case of the upset lugs, depending on the amount of upset and the position thereof.

Thus it will be seen that we have provided a means of securing a brake drum member and backing plate member in position and also a means for interlocking a brake drum and coaxial backing plate against relative rotation about the common axis, thus permitting the economical manufacture of drums and backing plates of different metals or different grades or gauges of steel.

We claim:

1. In a brake drum and backing plate combination a drum member and a backing plate member adapted to be secured thereto in axial alignment therewith, a plurality of projections on one of said members, an annular flange on the other member and said flange having recesses complementary to and adapted to receive said projections for securing the members against relative rotation about the common axis.

2. In a brake drum and backing plate combination, a drum member and a backing plate member, said drum having a plurality of spaced apart perforations spaced back from the edge thereof, said backing plate arranged within the drum and having a plurality of projections extending therefrom in the same plane therewith and projecting into said perforations for securing said members against relative rotation about the common axis.

3. In a brake drum and backing plate combination, a brake drum element and a backing plate element, a channel on one of said elements adapted to engage a marginal portion of the other element when the elements are in contact and axially aligned, the bottom of said channel having recesses, the marginal portion of the other element having a plurality of projections adapted to be received in said recesses whereby the elements are secured against relative rotation about the common axis.

4. A brake drum and backing plate combination including a drum member, a backing plate member associated with the drum and arranged normal to the axis of the drum, and an annular inwardly facing channel on one of said members embracing portions of the peripheral margin of the other.

5. In a brake drum and backing plate combination, a drum member and a backing plate member, said drum having a plurality of spaced apart perforations spaced back from its marginal edge and adjacent to said marginal edge, said backing plate having a plurality of integral projections along its marginal edge and recessed surfaces between said projections, said backing plate arranged within said drum, the recessed surfaces of said backing plate engaging the inner surface of the wall of said drum and said projections extending into said perforations for securing said members against relative rotation.

RUSSELL S. BEGG.
RUDOLPH H. THOMS.